US008085340B2

(12) United States Patent
Aikawa

(10) Patent No.: US 8,085,340 B2
(45) Date of Patent: Dec. 27, 2011

(54) CAMERA

(75) Inventor: Satoshi Aikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1494 days.

(21) Appl. No.: 11/196,101

(22) Filed: Aug. 3, 2005

(65) Prior Publication Data

US 2006/0028580 A1 Feb. 9, 2006

(30) Foreign Application Priority Data

Aug. 5, 2004 (JP) ................................. 2004-228793

(51) Int. Cl.
*H04N 5/222* (2006.01)
(52) U.S. Cl. ........ 348/370; 348/371; 348/372; 348/373; 348/374; 348/375
(58) Field of Classification Search .......... 348/370–376; 396/176, 177, 178, 179
See application file for complete search history.

(56) References Cited

U.S. PATENT DOCUMENTS 4,125,766 A * 11/1978 Holtje ..................... 250/214 SF

FOREIGN PATENT DOCUMENTS

| JP | 2000-047299 | 2/2000 |
| JP | 2002-122911 | 4/2002 |
| JP | 2002122911 A * | 4/2002 |

\* cited by examiner

*Primary Examiner* — Yogesh Aggarwal
(74) *Attorney, Agent, or Firm* — Cowan, Liebowitz & Latman, P.C.

(57) ABSTRACT

A camera is disclosed, which has a simple structure and capable of detecting a flash light amount at high accuracy. The camera comprises a camera body unit, a exterior unit fixed to the camera body unit, a flash unit provided on the exterior unit, a first light-leading member which has a flexibility and is used for leading light from the flash unit, and a light-receiving element receiving light that has passed through the first light-leading member. Both the first light-leading member and the light-receiving element are fixed to the exterior unit.

5 Claims, 10 Drawing Sheets

PRIOR ART

CAMERA

FIELD OF THE INVENTION

The present invention relates to a camera, in particular a camera having a light control function of a flash unit.

BACKGROUND OF THE INVENTION

An attaching method for a light-amount sensor used for light-emitting control of a flash unit in cameras has been disclosed in Japanese Patent Laid-Open Publication No. 2002-122911. The description will hereinafter be given of the method with reference to FIG. 10.

The camera disclosed in Japanese Patent Laid-Open Publication No. 2002-122911 has an upper cover unit 1305 and a camera body unit 1306. The flash light (leaked light) leaking from the side of a flash panel 1124, which is attached to the upper cover unit 1305, enters an optical fiber tube 1127. The emergent portion of the optical fiber tube 1127 is glued on a coupler 1307, and fixed to a surface opposite to the camera body unit 1306 with screws.

A case 1131 is fixed to the camera body unit 1306, and a hole 1131a is formed from the case 1131 toward the upper caver unit 1305. When the upper cover unit 1305 is attached to the camera body unit 1306, the coupler 1307 is inserted into the hole 1131a. A diffusing plate (diffuser) 1132 is provided ahead of the hole 1131a, and the leaked light transmitted through the optical fiber tube 1127 illuminates the end surface 1132a of the diffusing plate 1132.

The illuminated diffusing plate 1132 emits light whose directivity is reduced by the diffusion effect, from the surface 1132b forming an angle of 90 degrees with the end surface 1132a. The case 1131 has a hole directing the emitting surface 1132b of the diffusing plate 1132, and a light-control sensor 1102 is fixed by a spring, not shown in the figure, via an infrared cut filter 1133.

In the above-described flash-light-amount detection system, since the optical paths in the upper cover unit 1305 and in the camera body unit 1306 are formed separately, the tolerance of the emergent position of the optical fiber tube 1127 becomes large. The diffusing plate 1132 has a function of absorbing the position tolerance.

However, the above-described flash-light-amount detection system includes a lot of constituent parts. Specifically, the coupler for fixing the optical fiber tube, the light-amount sensor, the diffusing plate, the case holding the diffusing plate and the spring for fixing the light-amount sensor are separately included, thereby increasing the cost of the constituent parts and fabrication totally. Consequently, the proportion of the constituent parts of the flash-light-amount detection system in the camera becomes large, thereby increasing the size of the camera.

Further, since the flash-light-amount detection system is constituted by two units which are the upper cover unit and the camera body unit, the positional tolerance becomes large, and thereby the diffusing plate is required for absorbing the positional tolerance. However, using the diffusing plate makes the light-receiving loss large. Therefore, increasing the sensitivity of the sensor is required, thereby deteriorating the S/N ratio.

In addition, since the function and operation of the flash-light-amount detection system cannot be checked independently, it is not possible to confirm whether each components of the detection system functions normally or not and whether the fabrication has finished normally or not until the upper cover unit and camera body unit are assembled. Therefore, if any trouble is detected after the assembling of the upper cover unit and camera body unit, it takes a long time to identify the trouble section and overhaul it, thereby increasing the cost.

BRIEF SUMMARY OF THE INVENTION

One object of the present invention is to provide a camera with a simple structure and capable of detecting a flash light amount at high accuracy.

A camera one aspect of the present invention comprises a camera body unit, a exterior unit fixed to the camera body unit, a flash unit provided on the exterior unit, a first light-leading member which has a flexibility and is used for leading light from the flash unit, and a light-receiving element receiving light that has passed through the first light-leading member. Then, both the first light-leading member and the light-receiving element are fixed to the exterior unit.

Other objects and features of the present invention will become readily apparent from the following description of the preferred embodiments with reference to accompanying drawings.

DETAILED DESCRIPTION OF THE PREFERRED EMBODIMENTS

Preferred embodiments of the present invention will hereinafter be described with reference to the drawings.

Figure 1:
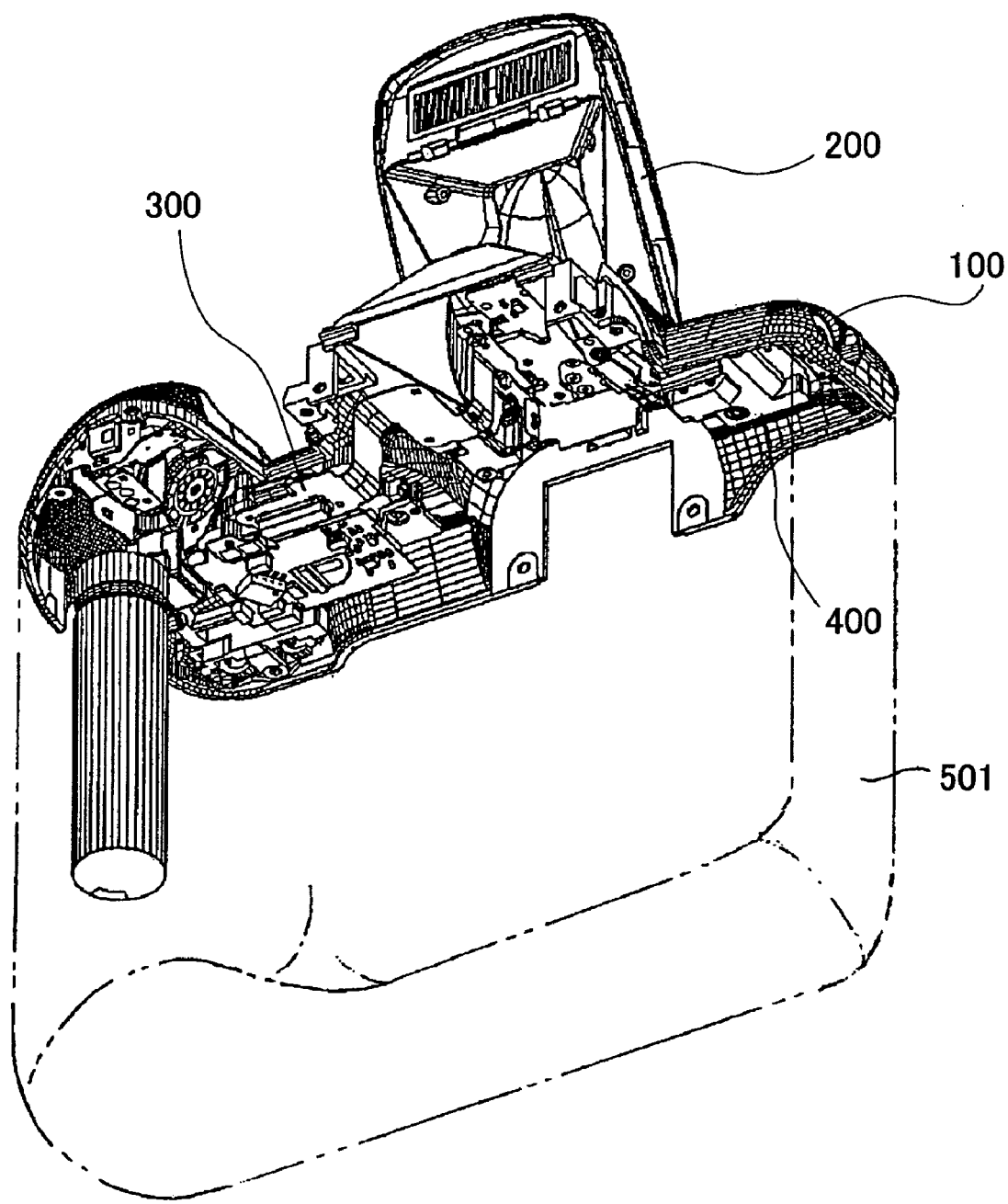
FIG. 1 is a perspective view showing the assembled upper cover unit of the camera that is an embodiment of the present invention.
Figure 2:
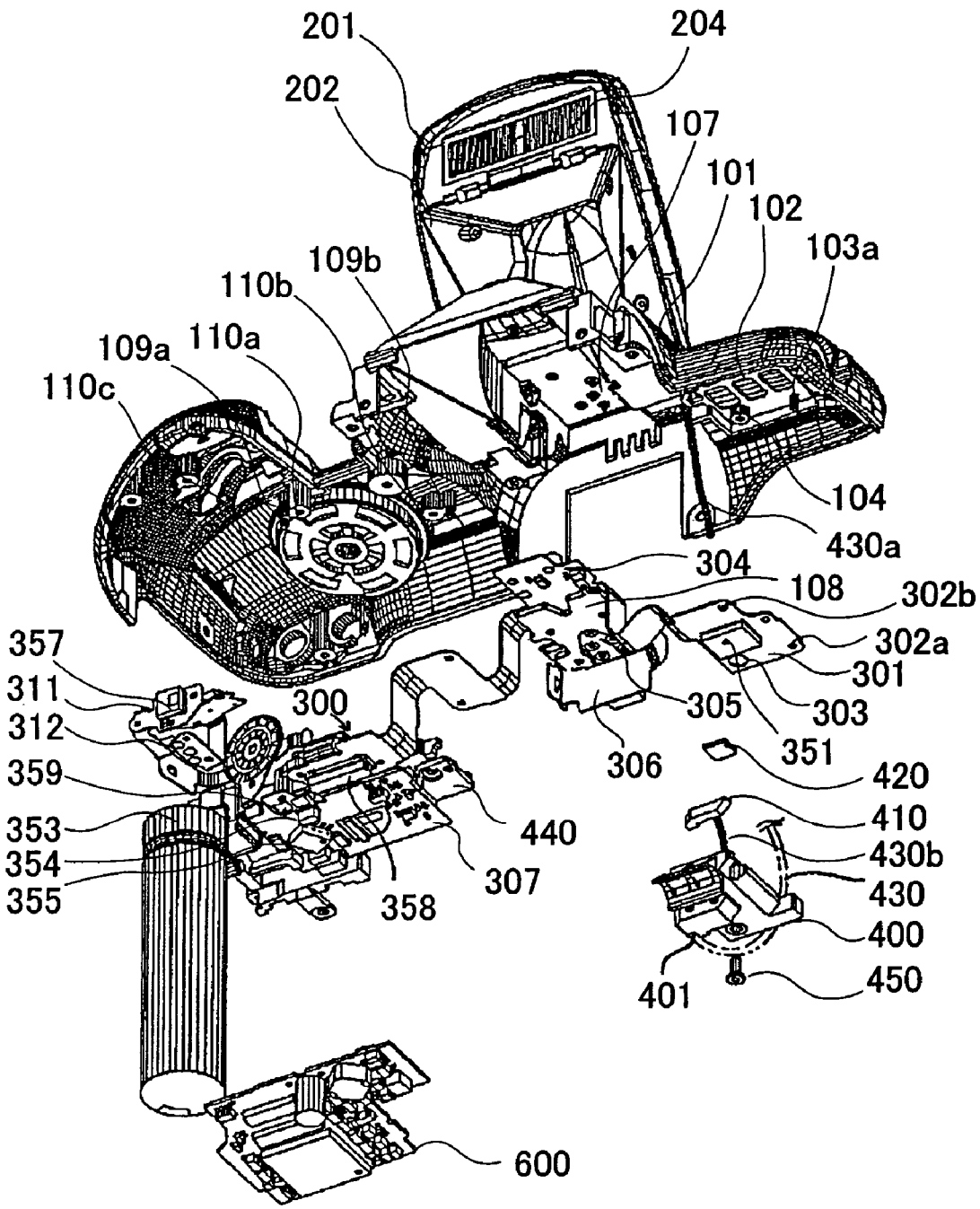
FIG. 2 is an exploded front perspective view showing the upper cover unit in the embodiment.
Figure 3:
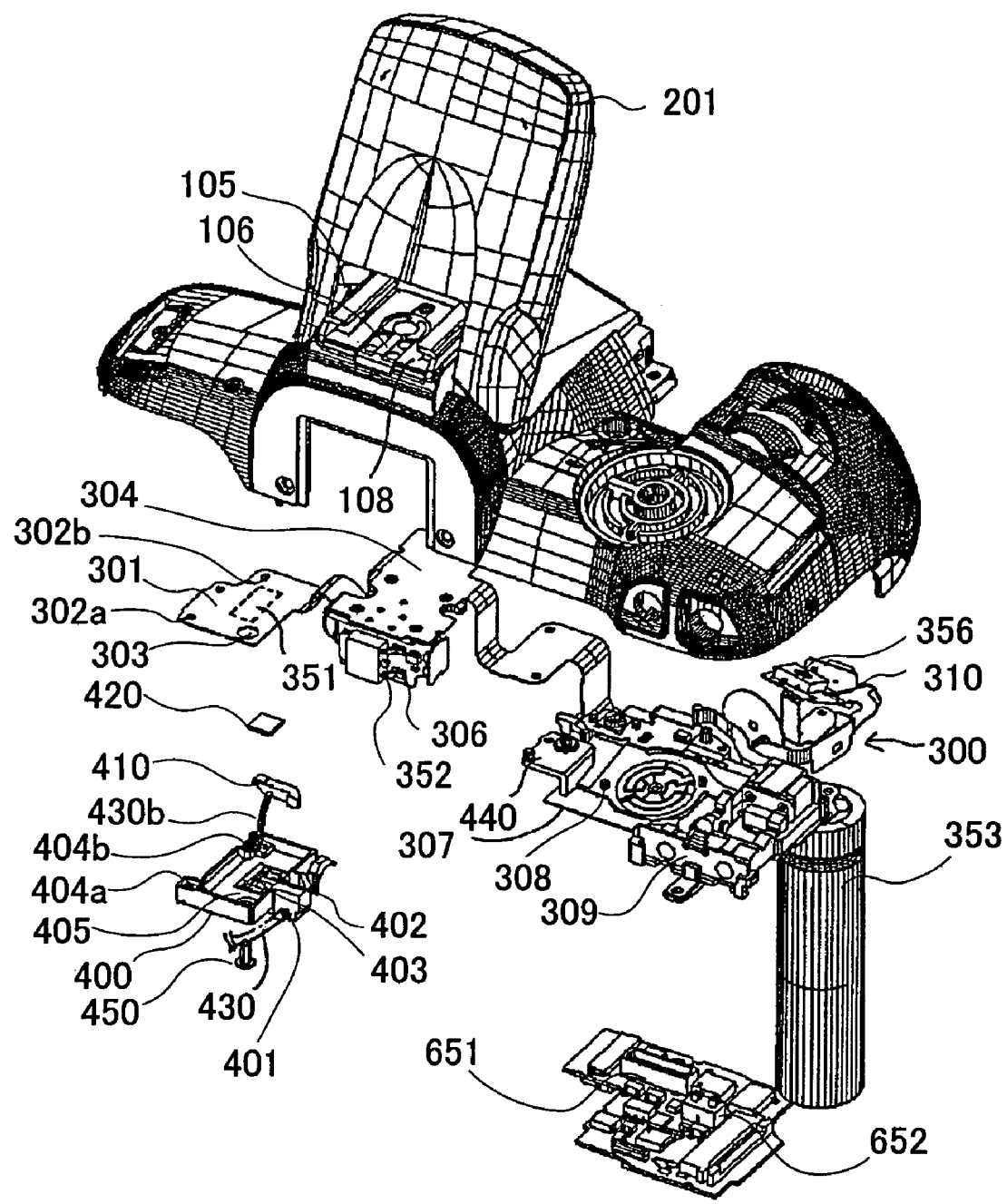
FIG. 3 is an exploded rear perspective view showing the upper cover unit in the embodiment.
Figure 4A:
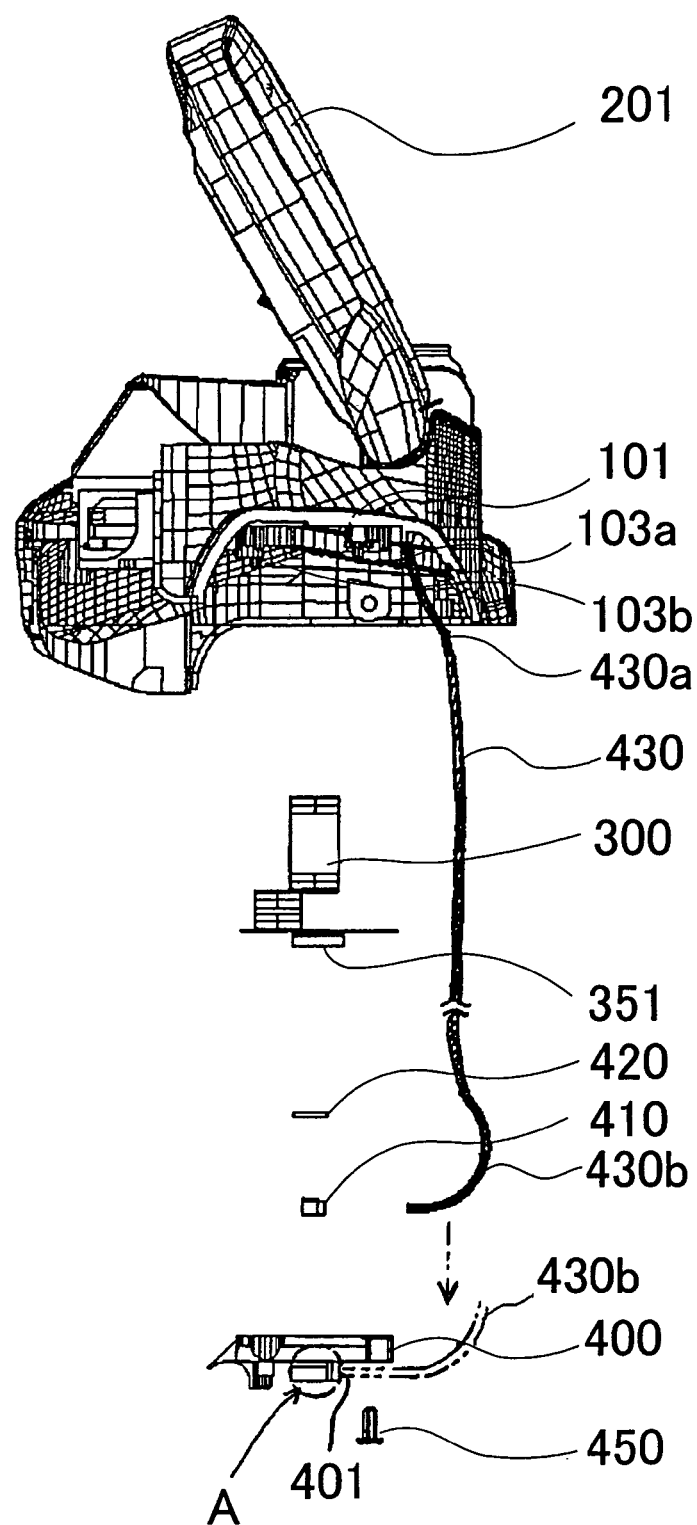
FIG. 4A is an exploded side perspective view showing the upper cover unit in the embodiment.
Figure 4B:
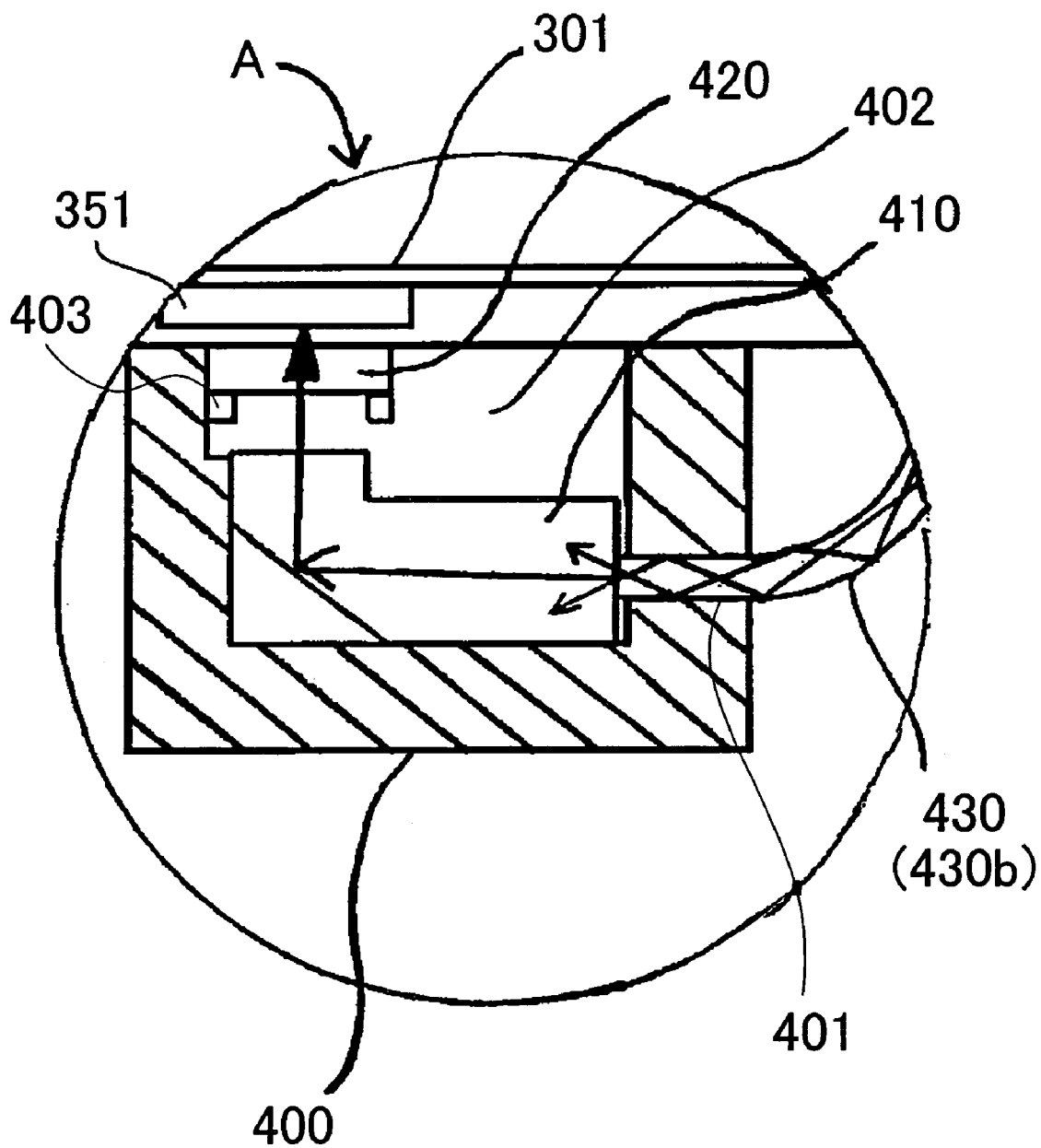
FIG. 4B is a sectional view showing the substantial part of the camera of the embodiment.
Figure 5:
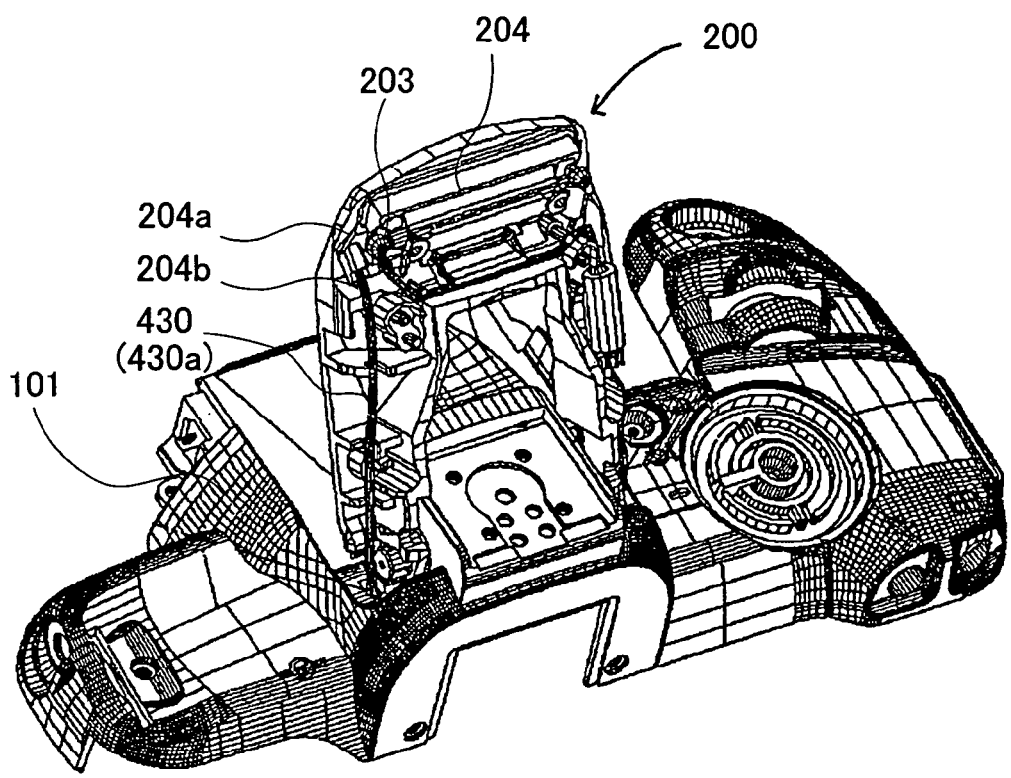
FIG. 5 is a rear perspective view showing the flash unit in the camera of the embodiment.
Figure 6:
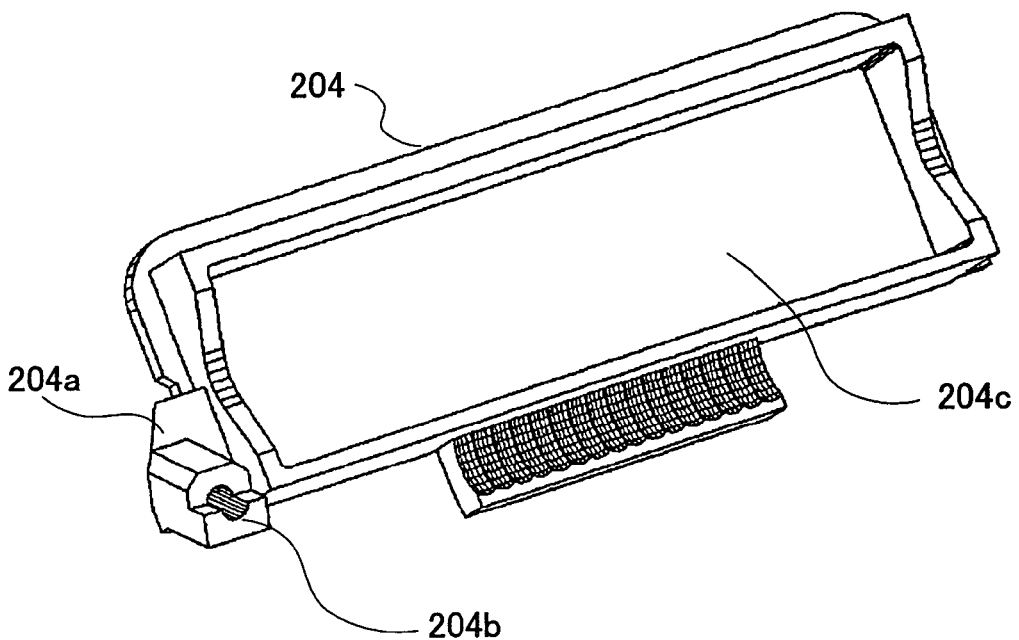
FIG. 6 is a rear perspective view showing the flash panel in the camera of the embodiment.

FIGS. 1 to 9 show a camera that is an embodiment of the present invention. FIG. 1 is a perspective view showing an assembled upper cover unit constituting the camera 500 of the embodiment. FIG. 2 is an exploded front perspective view of the upper cover unit. FIG. 3 is an exploded rear perspective view of the upper cover unit. FIG. 4A is an exploded side perspective view of the upper cover unit. FIG. 4B is an enlarged sectional view of the area A in FIG. 4A. FIG. 5 is a detail view of a flash unit in the camera of the embodiment. FIG. 6 is a rear perspective view of a flash panel in the camera of the embodiment.

Figure 7:
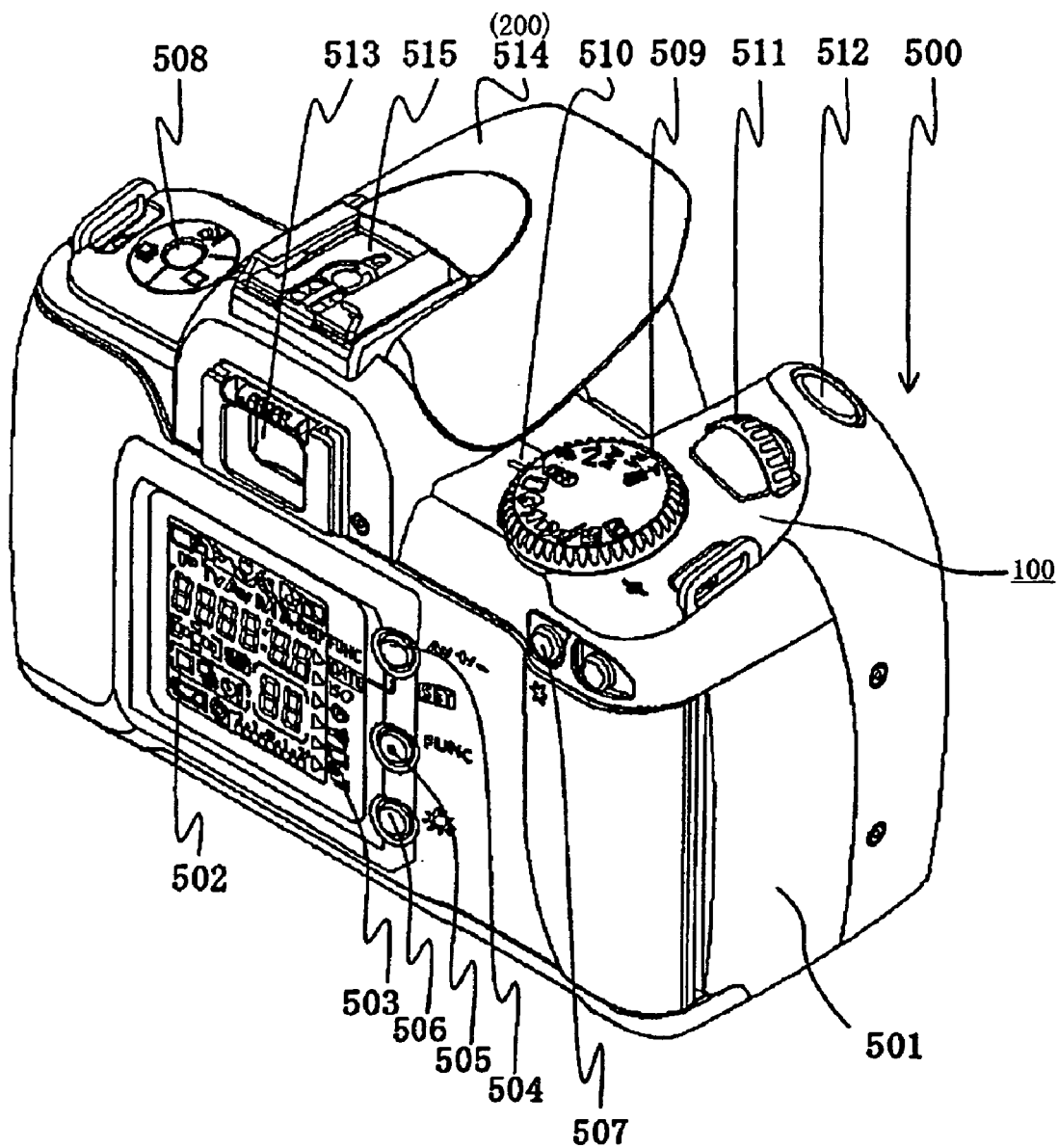
FIG. 7 is a rear perspective view showing the camera of the embodiment.
Figure 8:
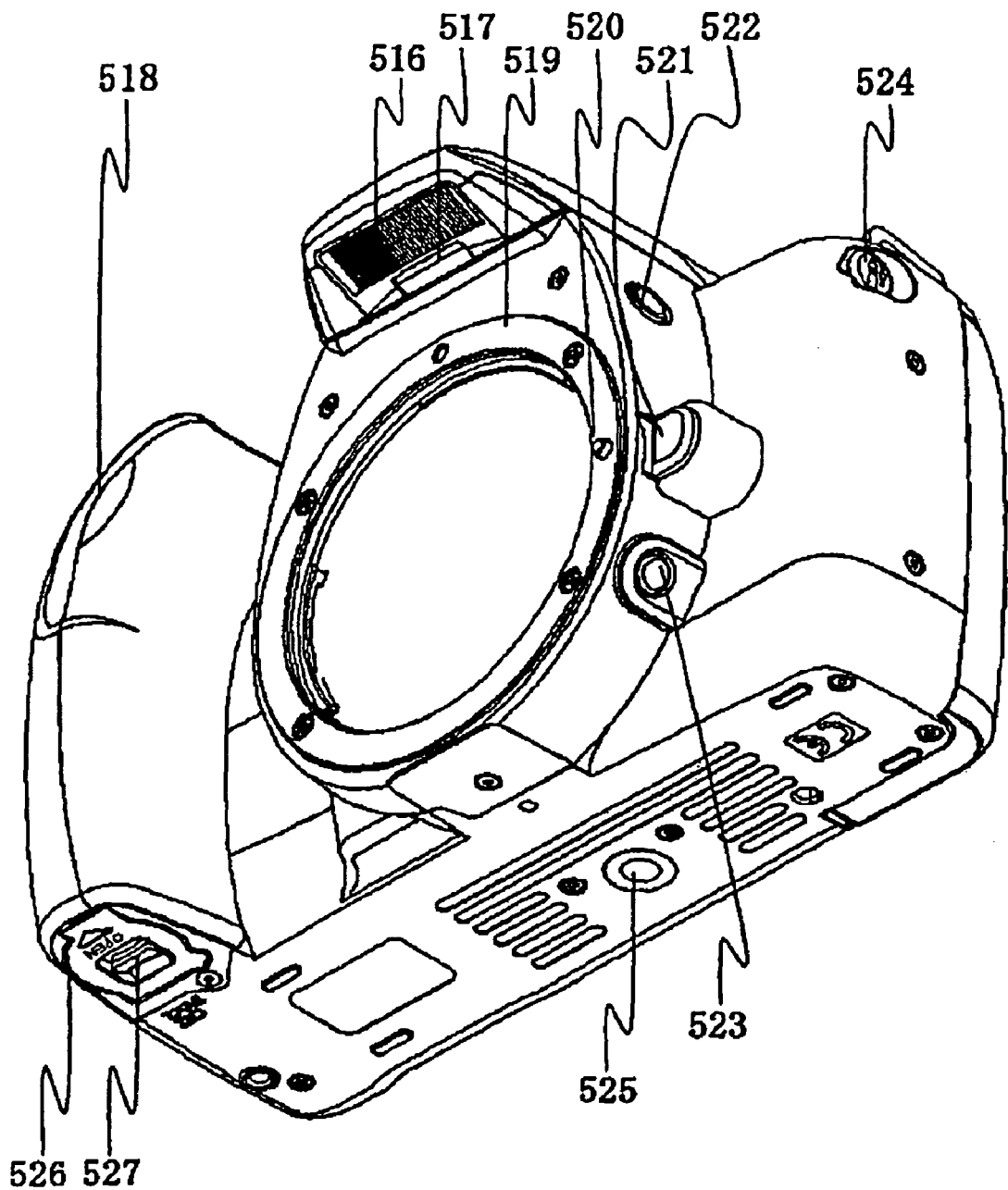
FIG. 8 is a front perspective view showing the camera of the embodiment.

In these figures, 100 denotes the upper cover unit, 200 a flash unit, 300 an upper cover FPC (flexible printed-circuit substrate) unit, and 501 a camera body unit of the camera 500 shown in FIGS. 7 and 8. 400 denotes a prism holder (holding member) which holds a prism 410 that is a second light-leading member, an infrared cut filter 420 and an optical fiber tube 430 (430a and 430b) that is a first light-leading member. 440 denotes a dial holding plate, and 600 a main board unit.

In this embodiment, the upper cover unit 100 and the flash unit 200 constitute an exterior unit, and the upper cover FPC 300, the infrared cut filter 420 and the prism holder 400 on which the optical fiber tube 430 is mounted, etc. constitute a flash-light-control unit (flash-light-amount detection unit) for the flash unit 200.

In FIG. 2, 101 denotes an upper cover, which covers the top surface of the camera 500 and rotatably supports the flash unit 200. The flash unit 200 pops up so as to protrude from the camera 500. In this pop-up state, an emission portion of the flash unit 200 is far away from an image-taking optical axis when flash light is used, thereby preventing shading by a lens mounted on the camera or red-eye. The flash unit 200 is retracted down when not used.

102 denotes a housing portion for housing a light-amount sensor 351 that is a light-receiving element, and 103a and 103b denote positioning pins for positioning the light-amount sensor 351. 104 denotes a screw hole for fixing the light-amount sensor 351. 105 denotes an accessory shoe on which accessories such as an external flash device is attached. 106 denotes a synchronic contact for transmitting electronic signals between the camera 500 and the accessory. 107 denotes a synchronic contact pin for connecting the synchronic contact 106 to a circuit in the camera 500.

108 denotes an accessory-shoe washer which is a metal plate for fixing the accessory shoe 105 on the camera 500 using screws. The accessory-shoe washer 108 reinforces the accessory shoe 105 so that the accessory shoe 105 can support an external force which acts on the accessory and is amplified via the accessory by the principle of leverage. 109a and 109b are positioning pins for positioning the dial holding plate 440, and 110a, 110b and 110c denote fixing screw holes for fixing the dial holding plate 440. The dial holding plate 440 is fixed with these pins 109a and 109b and holes 110a to 110c.

201 denotes a flash cover which covers the flash unit 200. 202 denotes a flash base plate which covers the undersurface of the flash unit 200 and functions as a base plate that each constituent part of the flash unit 200 is mounted on. 203 denotes a xenon tube in which xenon gas is encapsulated. The xenon tube 203 emits light generated by discharging and illuminates an object. 204 denotes the flash panel which is a transparent window member for collecting the light emitted from the xenon tube 203 toward the object (see FIG. 5).

In FIG. 6, 204a denotes a reflective surface having a prism-like shape and is formed on the flash panel 204. The reflective surface 204a totally reflects light which leaks from the side of the flash panel 204, and leads the leaked light to an optical-fiber insertion hole 204b. One end 430a of the optical fiber tube 430 is inserted into the optical-fiber insertion hole 204b. Since the amount of the leaked light and the total amount of light emitted from the flash unit 200 have a definite relation, it is possible to measure the total amount of the emitted light. 204c denotes a Fresnel surface which collects the light emitted from the xenon tube 203 according to an image-taking field angle.

In the upper cover FPC unit shown in FIGS. 2 and 3, 301 denotes a sensor mounting portion on which the light-amount sensor 351 is mounted. 302a and 302b are positioning holes for positioning the light-amount sensor 351 with the positioning pins 103a and 103b (see FIG. 4A). 303 denotes a screw hole for fixing the light-amount sensor 351. The light-amount sensor 351 is fixed to the fixing screw hole 104 formed in the upper cover unit 100 integrally with the prism holder 400 using a screw 450 that is a shared attaching member.

304 denotes an accessory-shoe connection portion which is fixed by sandwiching between the upper cover 101 and the accessory-shoe washer 108. 305 denotes a soldering land for soldering the synchronic contact pin 107. 306 denotes an X-circuit mounting portion on which an X-circuit 352 is provided. The X-circuit 352 is a circuit converting an X-contact signal, which is a signal supplied from the external flash device, a signal whose characteristics are non-identifiable, and a signal which has a possibility to bring any malfunction to the camera 500, into a signal usable normally in the camera 500.

307 denotes a flash-charging/discharging-circuit mounting portion on which a flash charging circuit 354 charging a main capacitor 353 and a flash discharging circuit 355 discharging the electricity accumulated in the main capacitor 353 when flash unit 200 emits light is mounted. 308 denotes a main-dial-encode pattern portion. The main-dial-encode pattern is an annular pattern for detecting the stop position of a main dial, which is provided on the upper cover 101, to switch power-off and power-on, and to select one of image-taking modes.

309 denotes an operation-switch-encode pattern portion for detecting the statuses of operation switches such as an exposure correction switch and a focus-detection-area selection switch. The main-dial-encode pattern portion 308 and operation-switch-encode pattern portion 309 is fixed to the dial holding plate 440.

310 denotes a release switch mounting portion on which a release switch 356 is provided, and the after-mentioned release button for controlling exposure operations of the camera 500 is mounted on this portion. 311 denotes a signal-receiving-sensor mounting portion on which a wireless-remote-control-signal receiving sensor 357 is mounted. 312 denotes a battery-pack-contact land used for transmitting signals between a battery pack, not shown in the figure, and the camera 500. In particular, a signal from a vertical-position release switch provided on the battery pack is transmitted to the camera 500 via the battery-pack-contact land 312.

Next, the detailed description will be given of the detection system (flash light amount detection unit) for detecting the amount of the flash light with reference to FIGS. 4A to 6. FIG. 4B is an enlarged view of the area A in FIG. 4A, showing a state in which the optical fiber tube 430 is built onto the prism holder 400.

The light emitted from the xenon tube 203 illuminates the object through the Fresnel surface 204c of the flash panel 204, and the above-mentioned leaked light is reflected on the reflective surface 204a and led to the optical-fiber insertion hole 204b. The end (incident portion) 430a of the optical fiber tube 430 is inserted into the optical-fiber insertion hole 204b, the optical fiber tube 430 leading the leaked light to another end (emergent portion) 430b thereof.

As shown in FIG. 4B, the emergent portion 430b of the optical fiber tube 430 is inserted into an optical-fiber insertion hole 401 formed in the prism holder 400, and fixed to (held by) the prism holder 400. Further, the prism holder 400 has a prism insertion opening 402. The prism 410 is inserted into the prism holder 400 through the prism insertion opening 402, and fixed to (held by) the prism holder 400.

The prism 410 has a fixed shape, in other words, has no flexibility, and includes an inner reflective surface. The leaked light emerged from the emergent portion 430b of the optical fiber tube 430, which is the first light-leading member, enters the prism 410, which is the second light-leading member, and led to an emergent surface of the prism 410. By using the prism 410, the traveling direction of the leaked light can be changed toward the light-receiving element (light amount sensor 351) without bending the optical fiber tube 430 (430a) forcibly.

Furthermore, though the curvature radius of the optical fiber tube 430 cannot be made so small when the optical fiber tube 430 is fixed to the prism holder 400, the prism 410 reflects the light emerged from the optical fiber tube 430 with a large area and leads it to the light-amount sensor 351 certainly. Therefore, it is possible to reduce the size of the entire optical system constituted by the prism 410 and the optical fiber tube 430.

In addition, a filter insertion portion 403 is formed in the vicinity of the prism insertion opening 402 in the prism holder 400.

The infrared cut filter 420 is fixed to this filter insertion portion 403, and cuts the unnecessary infrared component in the leaked light emerged from the prism 410.

Then, engaging the positioning pins 103a and 103b formed on the upper cover 101 with the positioning holes 404a and 404b of the prism holder 400 makes the infrared cut filter 420 face to face with the light-amount sensor 351. In this state, the prism holder 400 is fixed to the upper cover 101 with the screw 450. Thereby, the leaked light is led from the flash panel 204 to the light-amount sensor 351 through the optical fiber tube 430, prism 410 and infrared cut filter 420.

Since the prism holder 400 hold and fixes the optical fiber tube 430 and the prism 410, the structure from the emergent portion 430b of the optical fiber tube 430 to the light-amount sensor 351 is positioned accurately by the prism holder 400. Therefore, it is possible to transmit the leaked light to the light-amount sensor 351 in a state in which the flash light amount detection unit has a small number of intervenient parts, good positional accuracy with little superposition error, little loss of the light amount, and little superposition noise. Thereby, the present embodiment can achieve the optimal flash light control.

Further, since the embodiment uses the optical fiber tube 430, as the first light-leading member, having flexibility and little transmission loss of light, it is possible to lead the leaked light to light-amount sensor 351 effectively even if the flash unit 200 is moved. Furthermore, since the embodiment uses the prism 410 as the second light-leading member, it is possible to lead the leaked light to light-amount sensor 351 certainly without being affected by directions of the light from the optical fiber tube 430.

In addition, by the above-mentioned unitization, when some defect of the constituent parts or assembly, etc. occurs, it is possible to find and fix it promptly, thereby making it possible to reduce the failure cost.

Then, the upper cover unit 100 is built onto the camera body unit 501, and functions as part of the camera 500. At this time, electrical connections with the camera body unit 501 are required. In the conventional camera, the flash charging/discharging circuits are fixed to the camera body unit, and the flash emission portion is fixed to the upper cover unit. Therefore, the connection of a high-voltage and high-current signal line is required. However, this connection cannot be made with connectors having a low current capacity. Consequently, a few lead wires are soldered between the camera body unit and the upper cover unit.

In contrast, in this embodiment, the main capacitor 353, the flash charging and discharging circuits 354 and 355 are mounted on the upper cover unit 100. Accordingly, any high-voltage connection is not provided. Only the power supply current which is supplied to the flash charging circuit 354 is large, and a connector for a low current cannot be used.

Therefore, the receptacle 358 of a compact and low current-enabled B to B connector and a gold-plating pad 359 which can allow a large current of the power supply system are provided for signal connection on the upper cover FPC 300 mounted on the upper cover unit 100.

On the other hand, on the main board unit 600 fixed to the camera body unit 501, the plug 651 of a compact and low current-enabled B to B connector and an insulation displacement connector 652 which can allow a large current of the power supply system are provided. When the upper cover unit 100 is mounted on the camera body unit 501, the gold-plating pad 359 contacts the insulation displacement connector 652 first. This connection allows a large current, but it requires a large area. Therefore, this connection is used for the connection of the flash charging current in this embodiment.

Then, by making the plug 651 engage with the receptacle 358, the electric connection between the camera body unit 501 and the upper cover unit 100 is completed. During the connecting operation, no soldering of lead wires is required. Therefore, the assembling workability improves considerably, and it is possible to reduce the number of assembling processes and the defective fraction.

Further, since the flash-light-amount detection system is unitized on the upper cover unit 100, the design freedom of the system increases, thereby making it possible to achieve miniaturization of the camera 500. In addition, even if some defect of the constituent parts or assembly, etc. occurs, it is possible to find and fix it promptly, thereby making it possible to reduce the failure cost. Moreover, since the flash charging and discharging circuits 354 and 355 and the main capacitor 353 for the flash emission are mounted on the upper cover unit 100, the upper cover unit 100 and the flash unit 200 are further unitized, thereby increasing reliability of operations of the camera 500.

In other words, since the light-amount detection system for the flash unit 200 is constructed on the exterior unit, it is possible to provide a light-amount detection system having a simple structure and high detection accuracy. In addition, it is possible to realize a camera easy to check its operations and fix its defects.

Although the above-mentioned embodiment uses the prism 410 as the second light-leading member for leading the light from the optical fiber tube 430 to the light-receiving element 351, a structure may be adopted, in which a reflective surface is formed on the inner surface of a holding member corresponding the prism holder 400 by providing a reflective plate or coating with reflective paint.

In this case, the prism 410 becomes unnecessary, and the light from the optical fiber tube 430 is led to the light-receiving element 351 by the reflective action of the inner surface of the holding member. Thereby, it is possible to achieve further miniaturization of the detection system.

Next, the description will be give of the camera 500 to which the upper cover unit 100 of the above-described embodiment. FIG. 7 is a rear perspective view of the camera 500, and FIG. 8 is a front perspective view thereof.

501 denotes the camera body, and 502 denotes an external liquid crystal display unit which displays information such as image-taking setting states and the allowable number of image-taking.

503 denotes a FUNC mark which displays a function set by a FUNC button 505. 504 denotes an Av select button. In a manual mode, the aperture value can be changed by holing down the Av select button 504 and operating an electronic dial 511. In a mode other than the manual mode, the exposure value can be changed by holing down the Av select button 504 and operating an electronic dial 511. The Av select button 504 also has a SET function to set the clock.

505 denotes the FUNC button which sets various functions of the camera 500. When the FUNC button 505 is pushed once, an arrow in the display unit 502 indicates the 'DATE' of the FUNC mark 503, and settings on a DATA function can be performed. When the FUNC button 505 is pushed repeatedly, the arrow in the display unit 502 moves and indicates 'DATE', 'ISO,' 'red-eye reduction', 'electronic sound', 'multiple exposure' and 'AEB' in this order, and settings in each function can be performed by operating the electronic dial 511.

506 denotes an illumination button. When the illumination button 506 is pushed once, the backlight of the display unit 502 is lit. The backlight is turned off by a timer, and can be turned off compellingly by the illumination button 506 is pushed again. 507 denotes a partial photometry and AE lock button. When this AE lock button 506 is pushed, the AE value is fixed to a value corresponding to the detected partial photometry value at that time.

508 denotes a drive button. Each time the drive button 508 is pushed, the operation mode is changed to 'single-taking mode', 'continuous-taking mode', and 'self timer/wireless remote control mode' in this order. 509 denotes a mode dial. The mode dial 509 can be operated to 'OFF position' for power-off, 'image zone' and 'creative zone'. In the 'image zone', the camera determines the optimal exposure condition according to the position of the mode dial 509 rotated in the clockwise direction from the 'OFF position'. In the 'creative zone', the user can determine the exposure condition by rotating the mode dial 509 in the counterclockwise direction from the 'OFF position'. The operation mode of the camera is determined by rotating the mode dial 509 to set the icon corresponding to a desired operation to a mode dial indicator 510.

511 denotes the electronic dial for changing parameters at the time of each kind of setting as described above. 512 denotes the release button which has a two-step operation stroke. The first step operation (hereinafter, it is refer to as a SW 1) is to fix the AF (auto focus) and AE (auto exposure), and the second step operation (hereinafter, it is refer to as a SW 2) is to start the image-taking operation including a mirror-up, shutter operation (exposure), and mirror-down.

513 denotes a optical viewfinder for observing an object. 514 denotes a pop-up flash unit corresponding to the above-described flash unit 200 mounted on the upper cover unit 100. The camera 500 or user makes the flash unit 514 pop up and emit light according to photometry results or need, respectively.

515 denotes an accessory shoe which is an interface for attaching accessories such as an external flash device. 516 denotes a flash emission portion which emits flash light toward the object in the pop-up state to compensate a deficient light amount. 517 denotes a window of a red-eye reduction lamp which emits light just before an image-taking for a predetermined time in a case where the flash emission portion 516 emits light in the red-eye reduction mode. The red-eye reduction mode is a mode for reducing the generation of the red-eye by promoting contraction of the pupil.

518 denotes a light-receiving window for wireless remote control, which receives signal light from a wireless remote controller. The light-receiving window 518 is also used as a floodlight window for a self-timer lamp, which blinks at the time of the self-timer operation to inform the object person of the self-timer operation. 519 denotes a mount interface on which an interchangeable lens, not shown in the figure, is mounted by bayonet coupling.

521 denotes a mount-lock releasing button, and 520 a mount-lock pin. Pushing the mount-lock releasing button 521 makes the mount-lock pin 520 disengage from the interchangeable lens. Thereby, the user can rotate the interchangeable lens to disengage the bayonet coupling.

522 denotes an up button for making the flash unit 514 (200) pop up. In the creative mode, pushing the up button 522 makes the flash unit 514 automatically pop up and emit light. 523 denotes a depth-field check button. Pushing the depth-field check button 523 makes the stop diaphragm in the interchangeable lens narrow to the set aperture value, and thereby the user can check the depth field at the time of the image-taking.

524 denotes a wired remote control jack into which a plug of the wired remote controller is inserted. Inserting the plug into the jack makes it possible to operate the SW1 and SW2 with the wired remote controller. 525 denotes a tripod screw hole for fixing the camera to the tripod with a tripod screw, not shown in the figure.

526 denotes a battery cover, and 527 a battery-cover opening lever. Operating the battery-cover opening lever 527 makes the battery cover 526 open, and thereby the user can insert and remove the battery.

The camera 500 is an image-taking apparatus which takes an object image using an image-pickup element such as a CCD sensor and a CMOS sensor or a film.

Figure 9:
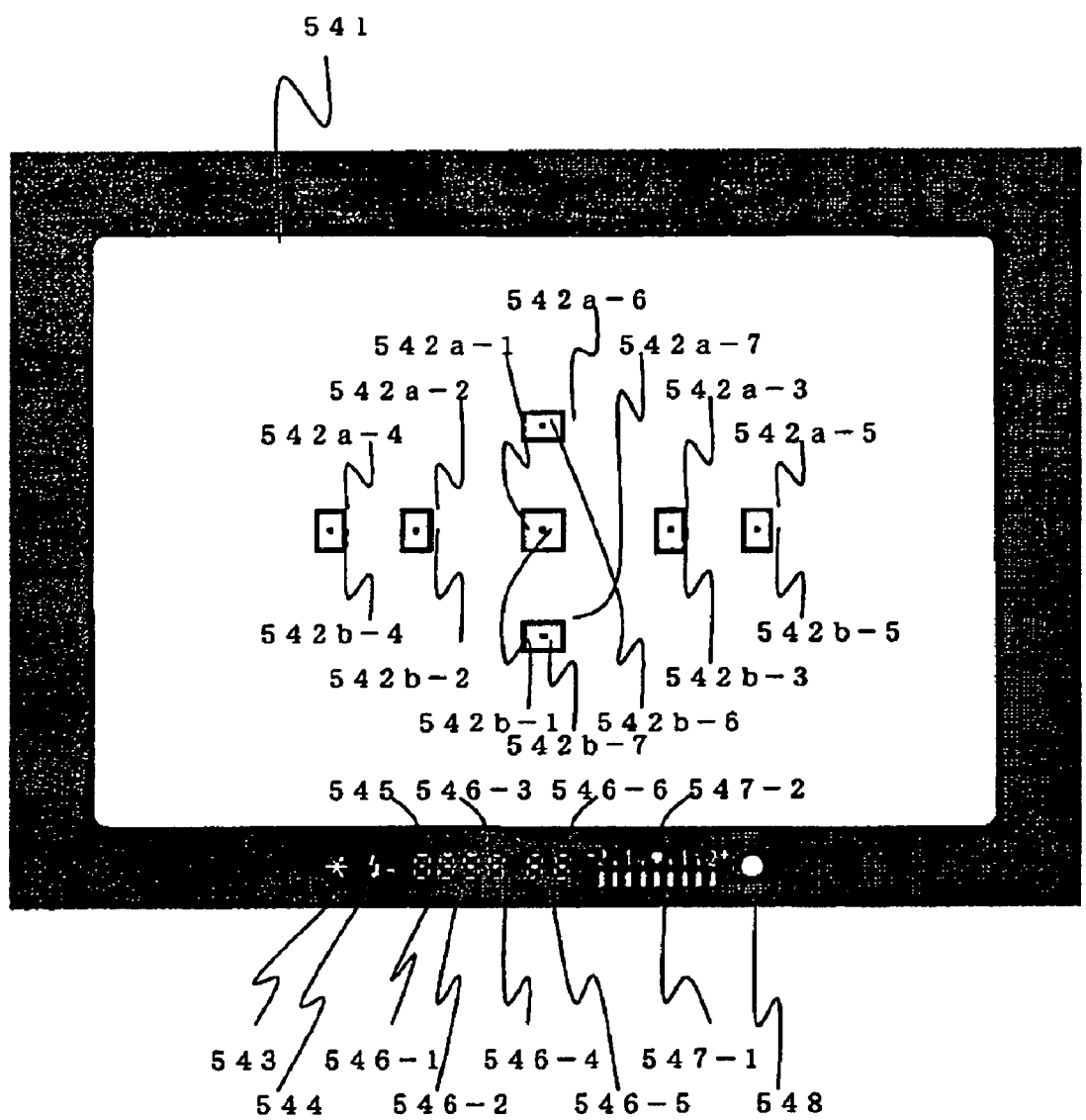
FIG. 9 is a diagram showing the display in the optical viewfinder in the camera of the embodiment.
Figure 10:
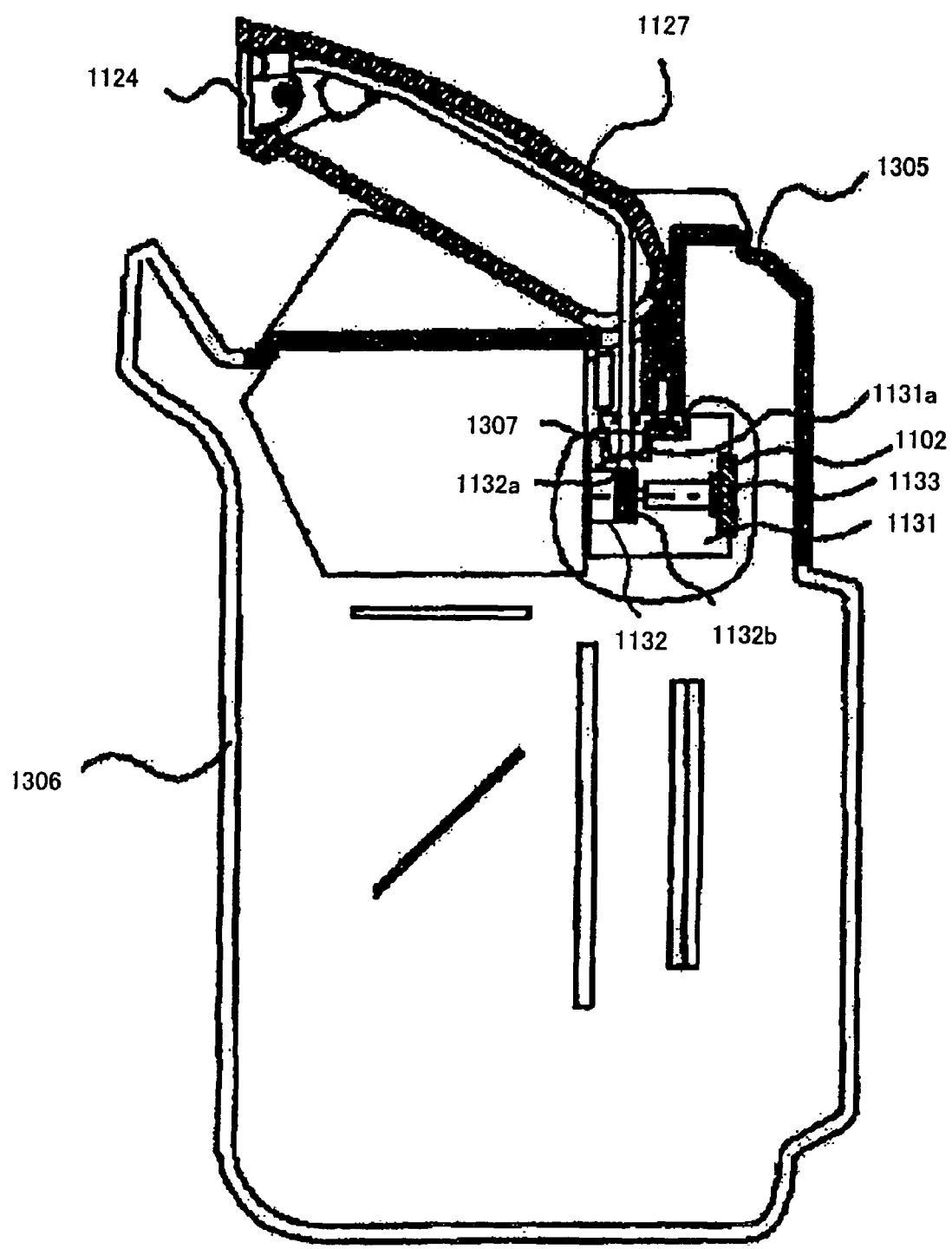
FIG. 10 is a sectional view of a conventional camera.

FIG. 9 shows the inside of the optical viewfinder 513 of the camera 500 of this embodiment. 541 denotes a finder field frame which shows a region where the camera 500 can take images. 542a-1 to 542a-7 denote focus detection areas which show areas where the camera 500 can perform the auto focus (AF). 542b-1 to 542b-7 denote superimposing display points each of which an indicator for showing the focus detection area where the camera 500 has selected among the focus detection areas 542a-1 to 542a-7 according to a predetermined algorithm or the user has selected optionally.

The superimposing display points appear as black points before the focus detection area is selected, but the selected one glows red by being illuminated by an LED. 543 to 548 denote in-finder LCDs. FIG. 9 shows a state in which all the LCDs is lighting. 543 denotes an AE-lock/FE-lock mark which lights in an AE lock state and an EF lock state.

544 denotes a flash mark which shows a status of the flash unit 514. 545 denotes a high-speed synchro mark which is displayed when a flash image-taking is executed at a shutter speed faster than a predetermined shutter speed. 547-1 denotes an exposure-level indicator, and 547-2 an exposure-level scale. These indicator 547-1 and scale 547-2 displays information on the exposure level. Further, the indicator 547-1 displays that the red-eye lamp is lighting in the red-eye reduction mode. 548 denotes an in-focus mark which lights in an in-focus state and blinks when an in-focus state cannot be obtained.

Applying the above-mentioned upper cover unit 100 to the camera 500 makes it possible to perform flash light emission with the optimal amount of light, and thereby it becomes possible to take natural and clear images without no luminance-saturated area, and to provide a low-cost and compact camera.

This application claims foreign priority benefits based on Japanese Patent Application No. 2004-228793, filed on Aug. 5, 2004, which is hereby incorporated by reference herein in its entirety as if fully set forth herein.

What is claimed is:

1. A camera comprising:
a camera body unit;
an exterior unit attached to the camera body unit;

a flash unit provided on the exterior unit;
a first light-leading member which has a flexibility and is used for leading light from the flash unit;
a light-receiving element receiving light that has passed through the first light-leading member; and
a second light-leading member leading light emerged from the first light-leading member to the light-receiving element,
wherein the second light-leading member has a fixed shape and an inner reflective surface, and
wherein, in a state where the camera body unit and the exterior unit are separated from each other, both the first light-leading member and the light-receiving element are fixed to the exterior unit without being fixed to the camera body unit.

2. A camera comprising:
a camera body unit;
an exterior unit attached to the camera body unit;
a flash unit provided on the exterior unit;
a first light-leading member which has a flexibility and is used for leading light from the flash unit;
a light-receiving element receiving light that has passed through the first light-leading member; and
an optical member having at least one of a filter action and a diffusing action,
wherein the optical member is fixed to the exterior unit, and
wherein, in a state where the camera body unit and the exterior unit are separated from each other, both the first light-leading member and the light-receiving element are fixed to the exterior unit without being fixed to the camera body unit.

3. The camera according to claim 2, further comprising:
a holding member fixed to the exterior unit, and
wherein the first light-leading member and the optical member are fixed to the exterior unit by being held by the holding member.

4. A camera comprising:
a camera body unit;
an exterior unit attached to the camera body unit;
a flash unit provided on the exterior unit;
a first light-leading member which has a flexibility and is used for leading light from the flash unit;
a light-receiving element receiving light that has passed through the first light-leading member; and
a second light-leading member leading light emerged from the first light-leading member to the light-receiving element,
wherein the second light-leading member is fixed to the exterior unit, and
wherein, in a state where the camera body unit and the exterior unit are separated from each other, both the first light-leading member and the light-receiving element are fixed to the exterior unit without being fixed to the camera body unit.

5. The camera according to claim 4, further comprising:
a holding member fixed to the exterior unit, and
wherein the first and second light-leading members are fixed to the exterior unit by being held by the holding member.

* * * * *